United States Patent
Self et al.

(10) Patent No.: US 6,715,111 B2
(45) Date of Patent: Mar. 30, 2004

(54) METHOD AND APPARATUS FOR DETECTING STROBE ERRORS

(75) Inventors: Keith Self, Aloha, OR (US); Michael Sandhinti, Olympia, WA (US); Sanjay Dabral, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 461 days.

(21) Appl. No.: 09/748,233

(22) Filed: Dec. 27, 2000

(65) Prior Publication Data

US 2002/0083376 A1 Jun. 27, 2002

(51) Int. Cl.[7] ............................................. G06F 11/00
(52) U.S. Cl. ......................................... 714/56; 710/15
(58) Field of Search ............................. 714/56, 51, 48, 714/47, 45, 39, 37, 43; 710/15, 17, 18, 29, 58

(56) References Cited

U.S. PATENT DOCUMENTS

| | | | | |
|---|---|---|---|---|
| 4,320,512 A | * | 3/1982 | Richman | 714/806 |
| 4,596,014 A | * | 6/1986 | Holeman | 714/805 |
| 4,931,922 A | * | 6/1990 | Baty et al. | 714/9 |
| 4,939,643 A | * | 7/1990 | Long et al. | 714/9 |
| 5,610,746 A | | 3/1997 | Ranallli | |
| 5,894,481 A | | 4/1999 | Book | |
| 5,905,391 A | | 5/1999 | Mooney | |
| 6,016,066 A | | 1/2000 | Ilkbahar | |
| 6,118,776 A | | 9/2000 | Berman | |

* cited by examiner

*Primary Examiner*—Nadeem Iqbal
(74) *Attorney, Agent, or Firm*—Kenyon & Kenyon

(57) ABSTRACT

A method and apparatus for detecting data strobe errors. A strobe error detection circuit has a strobe input and a counter coupled to the strobe input to count strobe pulses received. The circuit also has a comparator to determine if a strobe error has occurred based on the magnitude of the difference between a first count of strobe pulses and a second count of strobe pulses. In an embodiment, the first count is read from a memory location at a first time and the second count is read at a second time.

17 Claims, 6 Drawing Sheets

METHOD AND APPARATUS FOR DETECTING STROBE ERRORS

FIELD OF THE INVENTION

Embodiments of the present invention relate to a method and apparatus for detecting strobe errors. In particular, the present invention relates to a method and apparatus for detecting errors in a strobe received from a sending agent.

BACKGROUND

Computer systems may contain multiple agents that work together to perform tasks. For example, a computer system may contain multiple processors that may share system resources (e.g., input devices or memory devices) and may perform parallel processing. In many systems, messages are sent between system agents over a bus. Such a bus may include, for example, data bits, clock bits, parity bits, and reference bits. A sending agent may send data over the bus to a receiving agent.

In some systems, the bus includes one or more strobe bits that are used to trigger the capture of data sent over the bus. For example, a sending agent may send a strobe signal over the bus along with the data sent. A receiving agent may receive the data and the strobe signal, and the receiving agent may use the strobe signal to capture the data sent. In this case, the bus may be referred to as "source-synchronous" because it uses a strobe signal from the sending agent (i.e., the source) as a clock.

Busses that interconnect system components are subject to errors. A bus error has occurred if the correct logical information is not transferred over the bus. Bus errors may be caused by factors such as, for example, device failures, device marginality, power supply noise, poor continuity, external radiation, cosmic rays, or other noise. A bus error may be referred to as a "glitch." Bus errors may occur in any of the information being transferred on the bus, such as the data bits, reference bits, and/or strobe bits. Examples of strobe errors include a missing strobe pulse, an extra strobe pulse, and a timing change in the strobe pulse (i.e., a "jittered" strobe).

A strobe error may cause a receiving agent to improperly capture the data that is being sent. For example, the receiving agent may miss the data or may capture the data twice. While methods such as error correcting codes or parity codes may be used to correct errors in the data bits being transferred over the bus, such methods may not be useful in correcting an error in a strobe signal that is transferred over the bus.

DETAILED DESCRIPTION

Embodiments of the present invention relate to a method and apparatus for detecting errors in a strobe received from a sending agent. Such a strobe may be used, for example, to clock the capture of data by a receiving agent. When the strobe is operating normally, pulses are received by the receiving agent at a regular frequency. In an embodiment of the present invention, a strobe error detection circuit counts the pulses received and determines if a strobe error has occurred by comparing recorded counts of strobe pulses. The strobe received may not be used to operate a synchronous circuit to check itself. As such it is a poor time reference to determine when counts should be compared. In an embodiment of the present invention, the times for sampling strobe pulse counts are determined based on a second clock signal. In a further embodiment, this second clock signal is the core clock for the receiving agent. In such a system, the strobe pulse represents a first time domain, and the core clock represents a second time domain.

Figure 1:
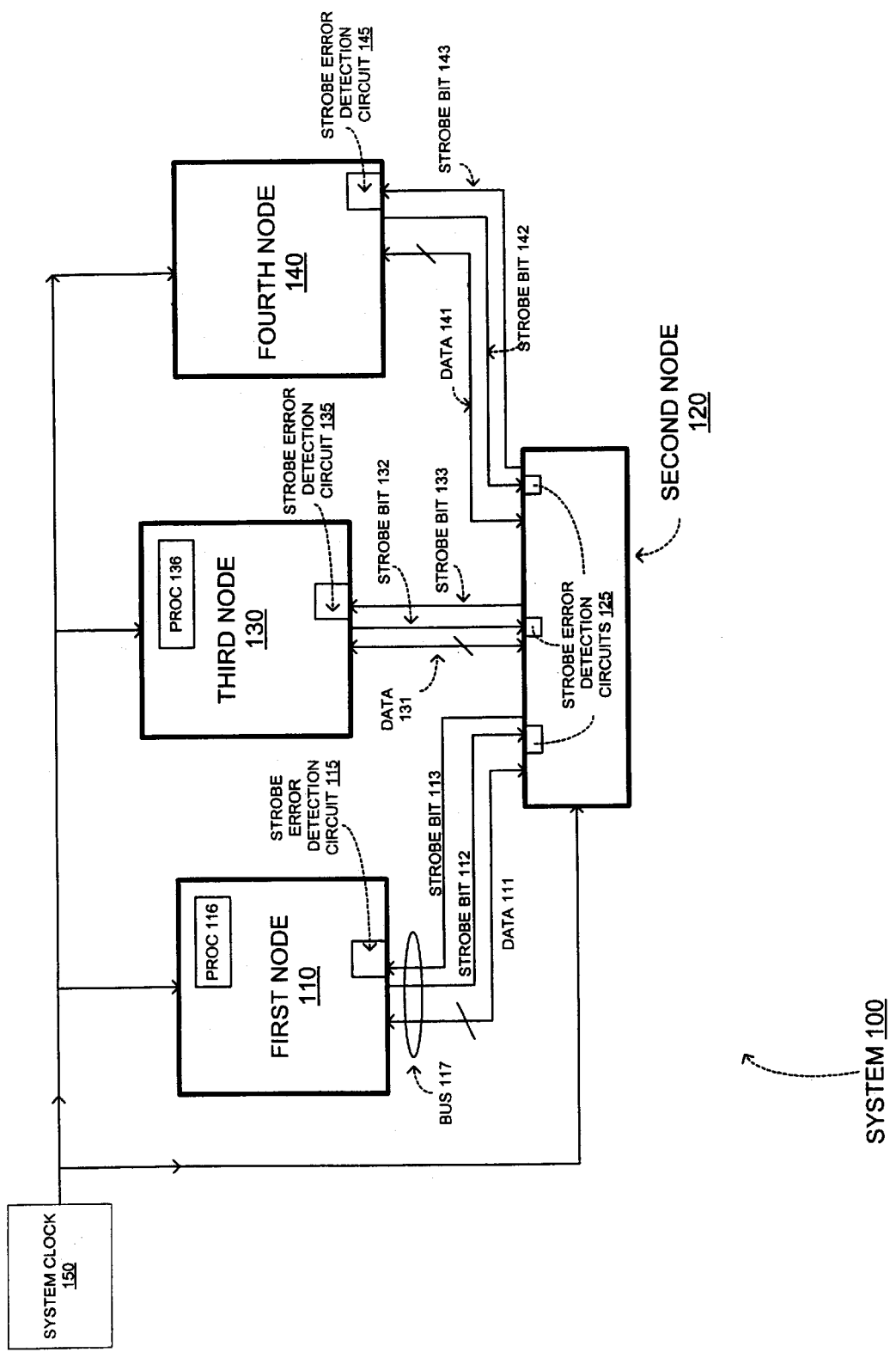
FIG. 1 is a partial block diagram of a system having nodes with strobe error detection circuits according to an embodiment of the present invention.

FIG. 1 is a partial block diagram of a system having nodes with strobe error detection circuits according to an embodiment of the present invention. FIG. 1 shows a system 100 which is a computer system that may include processors, memory devices, and input/output devices. Components in system 100 are arranged into architectural units that are referred to herein as "nodes." System 100 has a first node 110, second node 120, third node 130, and fourth node 140. In the embodiment shown, first node 110 includes a processor 116, and third node 130 includes a processor 136. Processor 116 and processor 136 may be any microprocessors that are capable of processing instructions. Each node in system 100 may contain multiple processors as well as other resources such as memory devices that may include Random Access Memories (RAMs) and cache memories. A node may also contain input/output devices such as displays, printers, etc. In an embodiment, processors in system 100 are capable or processing a program in parallel. As discussed below, in an embodiment nodes may send messages (e.g., data) to other nodes, in which case the node receiving the message is the receiving agent.

First node 110 is coupled to second node 120 through bus 117. The term "coupled" encompasses a direct connection, an indirect connection, an indirect communication, etc. Bus 117 may be a simultaneous bi-directional bus that includes data bits 111, a strobe bit 112, and a strobe bit 113. In other embodiments, the strobe error detection circuit of the present invention can be used with a un-idirectional bus. Strobe bit 112 may be used to conduct strobe signals (i.e., strobe pulses) from first node 110 to second node 120, and strobe bit 113 may be used to conduct strobe signals from second node 120 to first node 110. That is, second node 120 may use the signal received on strobe bit 112 as a clock signal when capturing data sent from first node 110 to second node 120 over bus 117, and first node 110 may use strobe bit 113 as a clock signal when capturing data sent from second node 120 to first node 110 over bus 117. Third node 130 is coupled to second node 120 through a bus that includes data bits 131, strobe bit 132 and strobe bit 133, and fourth node 140 is coupled to second node 120 through a bus that includes data bits 141, strobe bit 142, and strobe bit 143. Strobe bit 132 may be used to conduct strobe signals from third node 130 to second node 120, strobe bit 133 may be used to conduct strobe signals from second node 120 to third node 130, strobe bit 142 may be used to conduct strobe signals from fourth node 140 to second node 120, and strobe bit 143 may be used to conduct strobe signals from fourth node 140 to second node 120.

System 100 also includes a system clock 150 which is coupled to first node 110, second node 120, third node 130, and fourth node 140. Each node in system 100 may use system clock 150 to generate a core clock for that node. The core clock for each node may be used by the node to clock operations performed within the node. The core clock is generally more reliable than the strobe. In an embodiment, the strobe is used to trigger the capture of data sent from another node, rather than use the core clock to trigger such capture, because the system clock may have been delayed by a propagation delay prior to reaching the receiving node.

First node 110 contains strobe error detection circuit 115 which is coupled to strobe bit 113 and may be used to detect errors for strobe bit 113. Second node 120 contains three strobe error detection circuits 125 which may be used to detect errors for strobes bits 112, bit 132, and bit 142. Third node 130 contains strobe error detection circuit 135 which is coupled to strobe bit 133 and may be used to detect errors for strobe bit 133. Fourth node 140 contains strobe error detection circuit 145 which is coupled to strobe bit 143 and may be used to detect errors for strobe bit 143.

Figure 2:
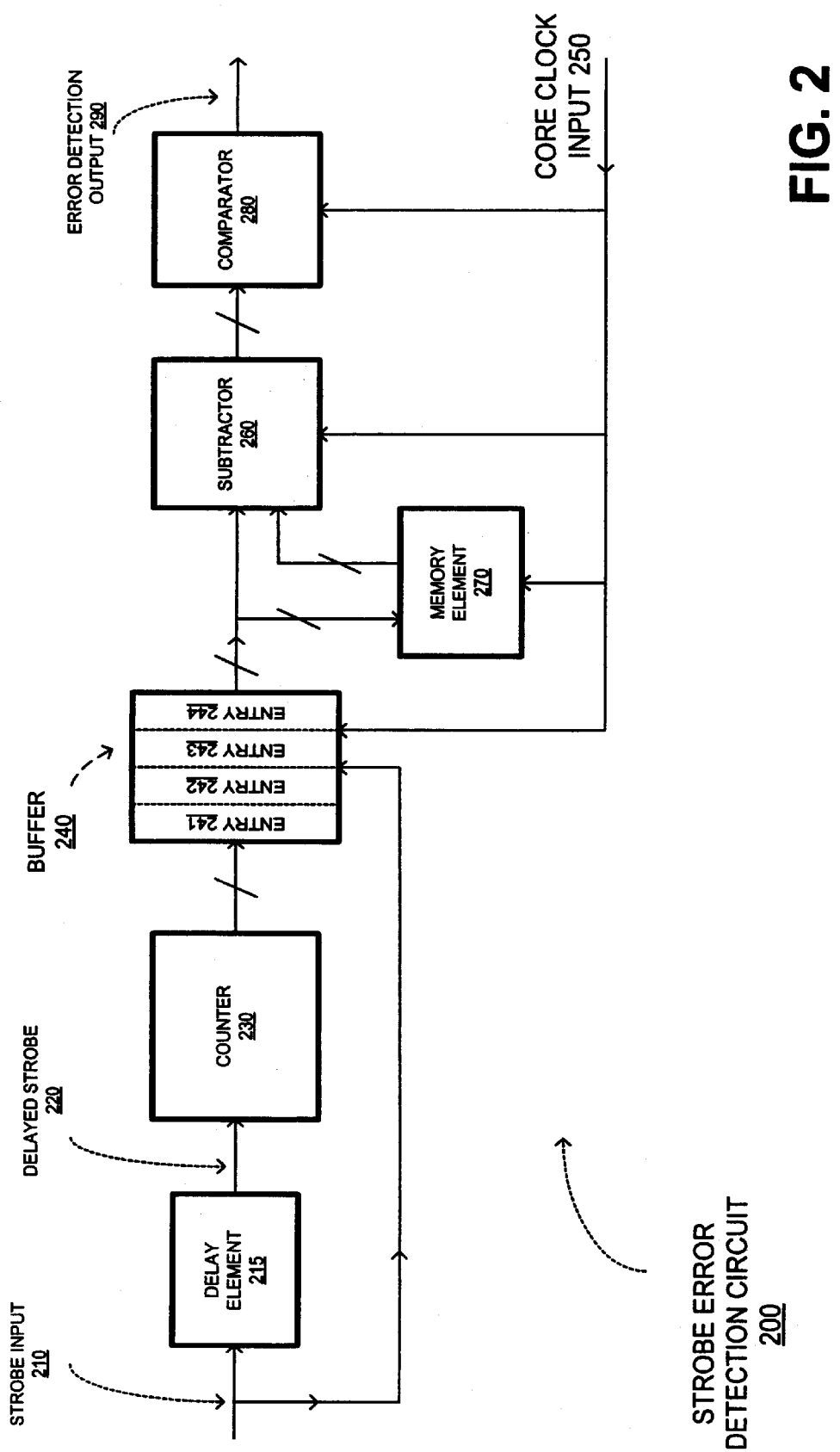
FIG. 2 is a partial block diagram of a strobe error detection circuit according to an embodiment of the present invention.

FIG. 2 is a partial block diagram of a strobe error detection circuit 200 according to an embodiment of the present invention. Strobe error detection circuit 200 may be, for example, similar to one or more of strobe error detection circuits 115, 125, 135, and 145 of FIG. 1. Strobe error detection circuit 200 contains a strobe input 210 which may be coupled to a strobe bit of a bus, such as strobe bit 113 of FIG. 1. Strobe input 210 of FIG. 2 is coupled to delay element 215, which in turn is coupled to counter 230. In one embodiment, delay element 215 is a delay lock loop. In an embodiment, delay element 215 delays the strobe pules by one half cycle, as will be discussed with regard to FIG. 3. In other embodiments, other delays may be used, such as for example a one cycle delay. Delay element 215 is coupled to counter 230 though delay strobe connection 220 which conducts a delayed version of the strobe to counter 230. In an embodiment, counter 230 maintains a count that is incremented each time that a pulse is received. For example, the count may be incremented each time counter 230 receives the rising edge of a pulse of delayed strobe 220. Of course, other types of counters may be used. For example, the counter may be triggered based on the falling edge of a pulse, and the counter may decrement the count maintained. In an embodiment, counter 230 is a 3-bit counter, in which case it may count from 0 to 7 and wrap around.

In an embodiment, counter 230 is coupled to a buffer 240 through an inter-connect that is capable of transferring the count in counter 230 to buffer 240 as an input. For example, if counter 230 is a 3-bit counter, then the 3-bit count maintained by counter 230 is transferred to buffer 240. Buffer 240 may contain multiple entries 241 to 244, each of which may contain a count of pulses. Buffer 240 may be coupled to strobe input 210 and may use strobe input 210 as a clock signal. In an embodiment, buffer 240 contains a pointer that points to an entry that contains the data most recently received and a pointer that points to the entry that contains the data least recently received. In an embodiment, buffer 240 is a deskew buffer. A deskew buffer is a buffer used to communicate between domains which have the same clock source (i.e., frequency) but different phase relationships.

In an embodiment, buffer 240 is coupled to a memory element 270 and a subtractor 260 such that memory element 270 and subtractor 260 are capable of receiving a count that was stored in an entry of buffer 240 as inputs. In an embodiment, the pulse count that was least recently received by buffer 240 is output to and stored by subtractor 260 and memory element 270. In an embodiment, memory element 270 is a flip-flop. Memory element 270 may be coupled to subtractor 260 as a second input to subtractor 260. Strobe error detection circuit 200 may also have a core clock input 250 which receives a clock signal that is used as the core clock for the node in which strobe error detection circuit 200 resides. Core clock input 250 may be coupled to memory element 270 and subtractor 260 to provide clocking inputs for the memory element 270 and subtractor 260. An output of subtractor 260 may be coupled to an input of a comparator 280. Comparator 280 may also be coupled to core clock input 250 and may use the core clock input 250 as a clocking signal. In addition, an output of comparator 280 may be coupled to a error detection output 290, which may be an output of strobe error detection circuit 200.

An example of the operation of circuit 200 will now be described. Strobe pulses are received at strobe input 210 and are delayed by delay element 215. A count maintained by counter 230 is incremented each time a new delayed pulse is received, and this new count is stored in an entry of buffer 240. The core clock 250 is used to output the count stored in buffer 240. Address pointers are reset on the write and read side of buffer 240 so that locations in buffer 240 are always reset after they are written.

As pulses are being received at the strobe input, core clock input 250 is also receiving core clock pulses that are used to determine time periods for sampling the counts in output from buffer 240. For example, at a first time period (t=1), memory element 270 receives a core clock signal from core clock input 250 and reads and stores a first pulse count that is output from buffer 240. This count will be the count that was least recently received by buffer 240 (i.e., the "first out"). At a second time (t=2), memory element 270 receives a core clock signal from core clock input 250 and reads and stores a second pulse count that is output from buffer 240. Although the second pulse count is, at time t=2, the pulse count least recently received by buffer 240, the second pulse count may be the same as the first pulse count if the first pulse count is still stored in buffer 240 at t=2. Also at t=2, subtractor 260 receives a core clock signal from core clock input 250 and determines the difference between the value stored in memory element 270 (the first pulse count) and the value output from buffer 240 (the second pulse count) and produces a result. Thus, subtractor 260 determines the difference between a count of strobe pulses which was read from buffer 240 at a first time and a count of strobe pulses which was read from buffer 240 at a second time.

Continuing with this example, when comparator 280 receives a core clock input pulse, comparator 280 compares the output of subtractor 260 to an expected value. For example, comparator 280 may compare the result that is output from subtractor 260 to determine whether it is equal to one (1). In other embodiments, a different expected subtractor output may be used. If subtractor 260 has not output the expected result, then comparator 280 may output a signal to error detection output 290 which signal indicates that a strobe error has been detected. Using the example above, if the result output by subtractor 260 is not equal to one, then comparator 260 outputs a result that indicates that a strobe error has been detected. If subtractor 260 has output the expected result, then in one embodiment comparator 280 may output a signal to indicate that an error has not been detected. As would be appreciated by a person of ordinary skill in the art, the first time and second time are based on the core clock input 250. In this sense, memory element 270 and subtractor 260 operate in the time domain of the node in which strobe error detection circuit 200 resides, while the components in the node that use the strobe input as a clock signal operate in the time domain of the node that sent the strobe signal. The operation of strobe error detection circuit 200 is further illustrated by the examples discussed below with reference to FIGS. 3–5.

Figure 3:
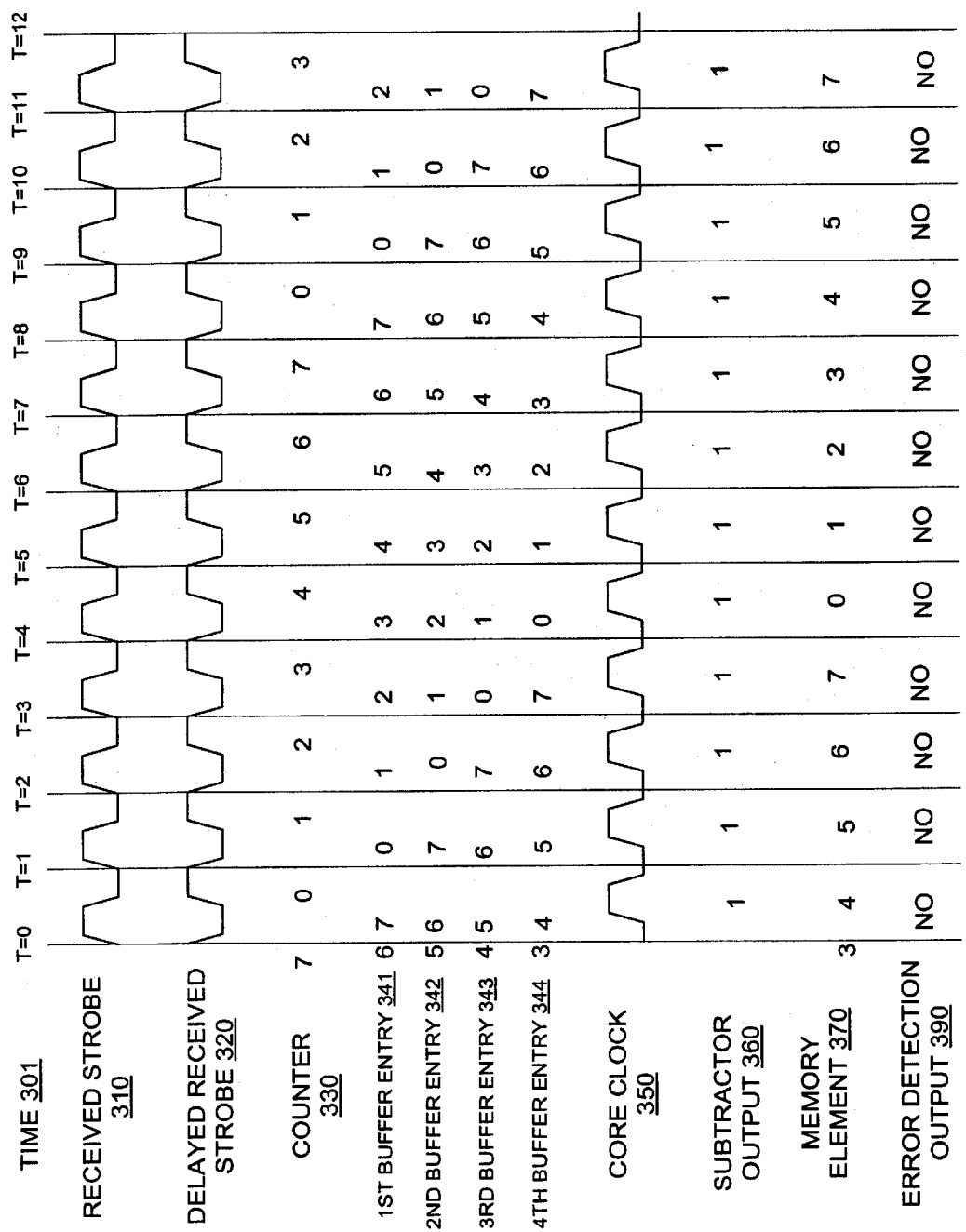
FIG. 3 is a partial timing diagram of signals, including a strobe without errors, in a strobe error detection circuit according to an embodiment of the present invention.

FIG. 3 is a partial timing diagram of signals, including a strobe without errors, in a strobe error detection circuit according to an embodiment of the present invention. FIG. 3 shows signal values, data values stored, and data values output over a period of time from t=0 to t =12. The times are indicated by the time 301 shown as the top line of FIG. 3. FIG. 3 also shows values for a received strobe 310, delayed strobe 320, and core clock 350 which may be an example of signals transmitted over the strobe input 210, delayed strobe 220 inter-connect, and core clock input 250 of FIG. 2. FIG. 3 also shows values for a counter 330 which may be pulse count values maintained by a counter such as counter 230. FIG. 3 also shows values stored in a first buffer entry 341, second buffer entry 342, third buffer entry 343, and fourth buffer entry 344, which may be values stored in entries 241 to 244 of a buffer such as buffer 240 of FIG. 2. FIG. 3 also shows values for a subtractor output 360, which may represent an output of a subtractor such as subtractor 260 of FIG. 2, and values for a memory element 370, which may represent values stored in memory element 270 of FIG. 2. Finally, FIG. 3 shows values for a error detected 390 output which may represent values output from an output of an error detection circuit such as error detection output 290 of FIG. 2.

The example shown in FIG. 3 will now be described. In this example, the circuit has been operating prior to time t=0. In this example, counter 330 has a value of 7 and memory element 370 has a value of 3 at time t=0. Also at time t=0, buffer entries 341 to 344 have values of 6, 5, 4 and 3 respectively. In addition, at time t=0 memory element 4 has a value of 1.

At a time after t=0, a strobe pulse is received. At this time, that input at received strobe 310 rises to a high state. The strobe input to the buffer causes the value at the counter 330 to be written into an entry of the buffer (here, first buffer entry 341) and causes the values in all of the other entries to be shifted. In an embodiment, the order of the buffer entries is maintained by pointers, and rather than actually shift values from one entry to another, the pointers are simply moved. At this same time, the delayed strobe will have gone into a low state due to the falling of received strobe 310 that had occurred prior to t=0.

The next event shown in FIG. 3 is the rising edge of the pulse at core clock 350. In this example, core clock 350 rises to a high state at a time after received strobe 310 has risen to a high state but before received strobe 310 has again fallen back to the low state. In the embodiment shown, received strobe 310 and core clock 350 have the same frequency but are out of phase. In other embodiments, the difference in phase may be smaller or larger, or the pulses may be in phase with each other. The rising edge of the pulse at core clock 350 acts as a clock signal to the memory element, subtractor, and comparator. In this embodiment, when the clock signal is received, the subtractor determines the difference between the output of the buffer and the memory element 370 before the memory element 370 latches the value at the buffer as the new value stored in the memory element. Thus, subtractor output 360 equals one because the difference between the fourth buffer entry 344 (which=4) and the memory element 370 (which=3) is one (1). At a later time, memory element 370 latches the output (4) of the fourth buffer entry 344. The comparator compares the subtractor output 360 to the expected subtractor output, which in this case is one. Because the expected subtractor output was received, the error detected output indicates that a error has not been detected.

At a latter time which is still prior to t=1, received strobe 310 falls to the low state and delayed received strobe 320 rises to the high state. At this time, counter 330 is incremented, and in this example wraps around to the value of 0. At a point after t=1, the received strobe 310 falls to the low state, and this pattern repeats itself. Because in the example shown in FIG. 3 the receives strobe 310 does not contain any errors, the error detected 390 output will always output a value indicating that an error has not been detected. Of course, the timing diagram shown in FIG. 3 is merely exemplary, and other values may be stored and output by components of a strobe error detection circuit according to the present invention.

Figure 4:
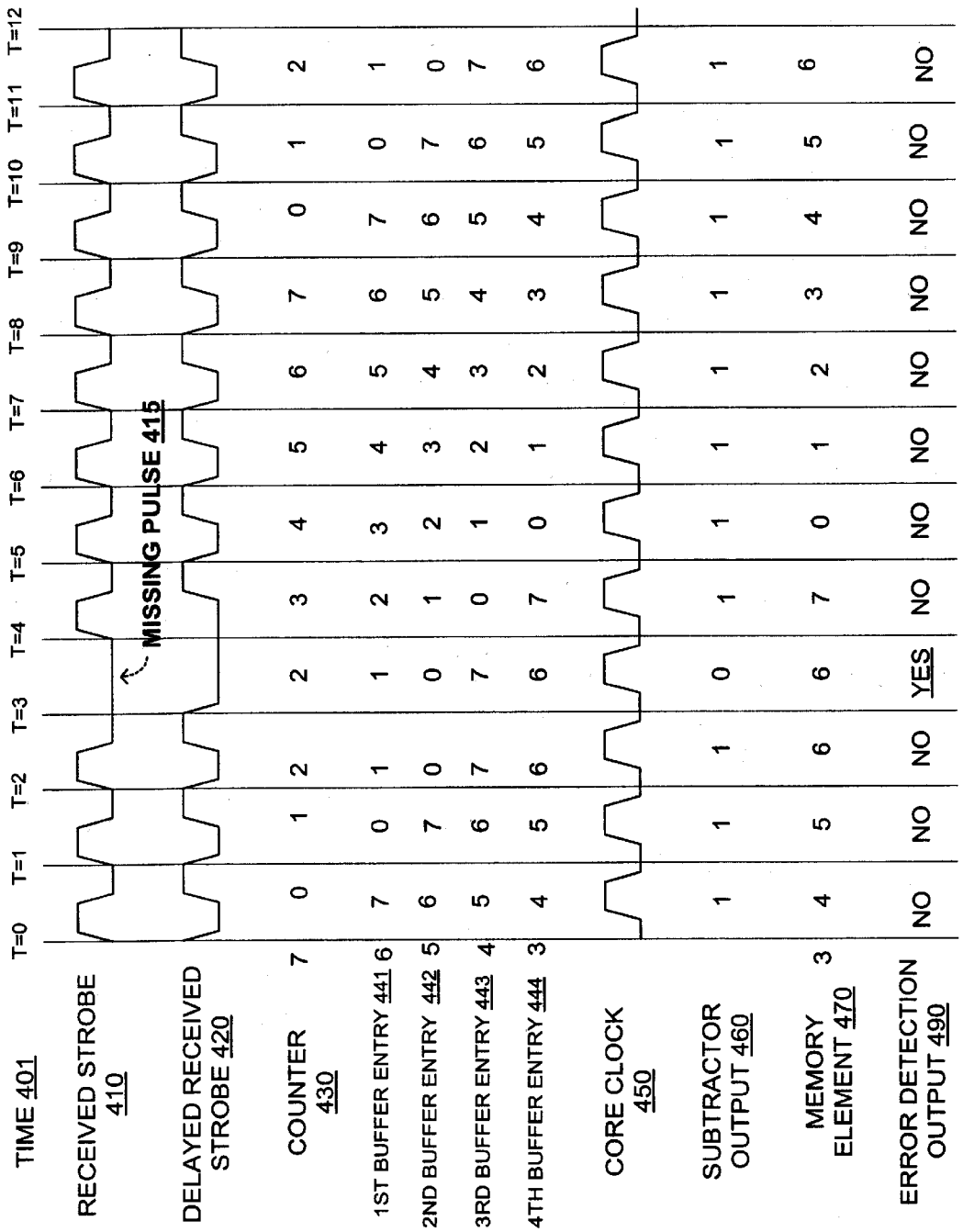
FIG. 4 is a partial timing diagram of signals, including a strobe with a missing pulse, in a strobe error detection circuit according to an embodiment of the present invention.

FIG. 4 is a partial timing diagram of signals, including a strobe with a missing pulse, in a strobe error detection circuit according to an embodiment of the present invention. FIG. 4 shows a time 401, received strobe 410, delayed received strobe 420, counter 430, buffer entries 441–444, core clock 450, subtractor output 460, memory element 470, and error detected output 490 which are similar to the corresponding information shown in FIG. 3. In FIG. 4, however, the received strobe 410 contains a missing pulse 415 between time t=3 and t=4. At t=3, the signal at received strobe 410 is low, the signal at delayed received strobe 410 is high, the counter has a value of 2, the buffer entries 441–444 have values of 1, 0, 7 and 6, the core clock is low, and memory element 470 has a value of 6.

At a time after t=3, the delayed received strobe 420 falls to the low state. Because of the missing pulse, the received strobe 410 does not rise to the high state until after t=4. Because the received strobe 410 does not rise to the high state until after t=4, the counter is not incremented and the buffer does not latch the value from the counter 430 until after t=4. The buffer is not clocked by the received strobe input 410 until after time t=4. The values in the buffer entries remain the same until a time after t=4, and the value output from the buffer remains at 6 until a time after time t=4.

At a time after t=3, the core clock 450 rises to the high state, which causes the subtractor to determine the difference between the output of the buffer (entry 444) and the output of memory element 470. Because the buffer output value of 6 was stored in the memory element at a time before time t=3, and the buffer output is still at the value of 6 when the core clock rises at a time after time t=3, then the subtractor output 460 is equal to zero (0). The comparator determines that the subtractor output was different that expected (i.e., was not equal to 1), and causes error detected output 490 to indicate that a error had been detected. Thus, the missing pulse 415 has been detected. Since there are no other errors in received strobe 410, from time t=4 to t=12 the circuit performs as described with reference to FIG. 3.

Figure 5:
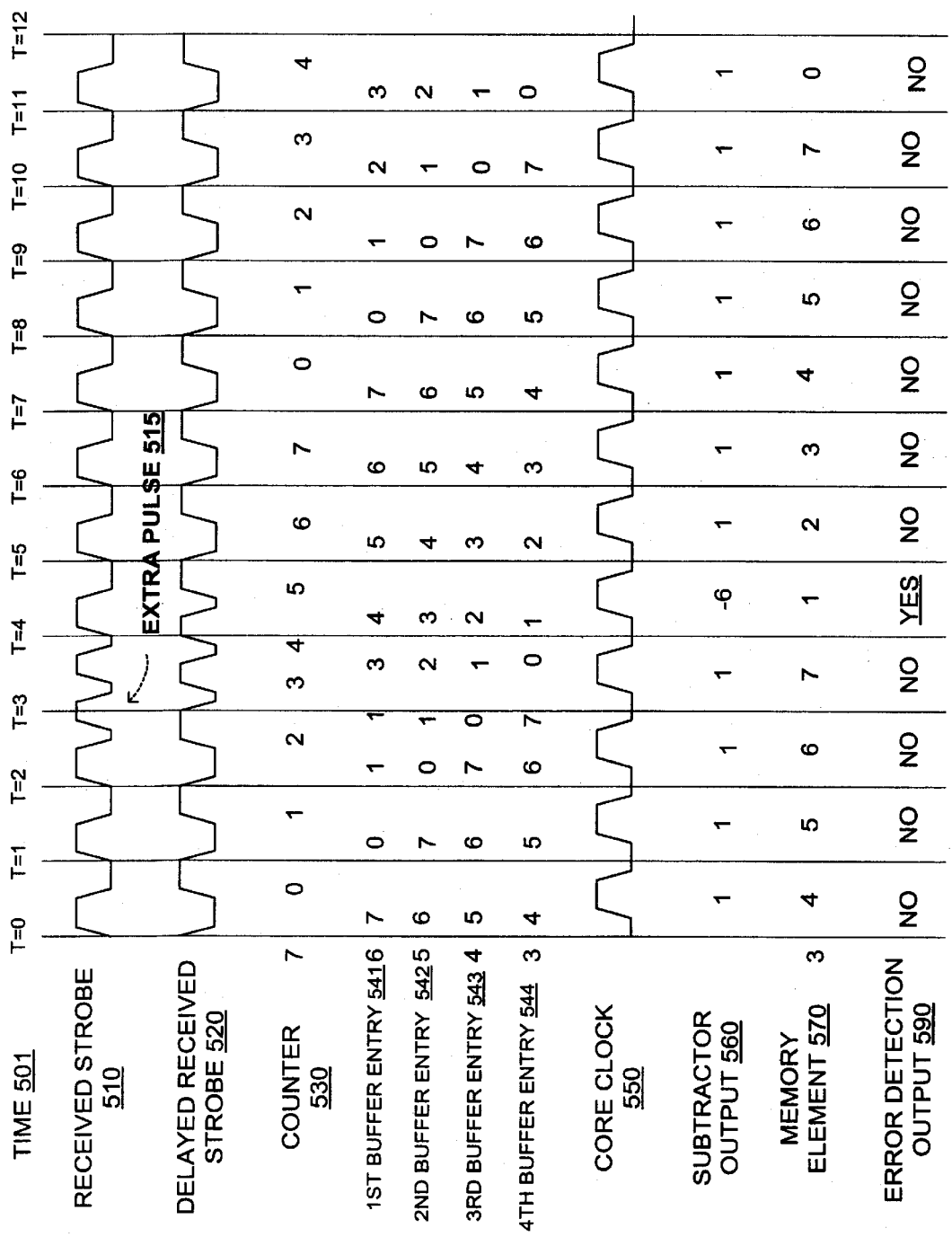
FIG. 5 is a partial timing diagram of signals, including a strobe with an extra pulse, in a strobe error detection circuit according to an embodiment of the present invention.

FIG. 5 is a partial timing diagram of signals, including a strobe with an extra pulse, in a strobe error detection circuit according to an embodiment of the present invention. FIG. 5 shows a time 501, received strobe 510, delayed received strobe 520, counter 530, buffer entries 541–544, core clock 550, subtractor output 560, memory element 570, and error detected output 590 which are similar to the corresponding values shown in FIGS. 3–4. In FIG. 5, however, the received strobe 510 contains an extra pulse 515 between times t=2 and t=4. Between time t=2 and t=4, the received strobe 510 rises and falls three times (instead of two times as would have occurred in there was no extra pulse) and delayed received strobe 520 falls and rises three times (again, instead of two times as would have occurred in there was no extra pulse). Thus, the counter is incremented three times from a value of 1 (at t=2) to a value of 4 (at t=4). Similarly, the output of the buffer changes from a value of 5 (at t=2) to a value of 0 (at t=4). Because the core clock 550 only provides two pulses during this time period, however, the memory element 570 does not latch every change in the buffer output 544. In particular, from t=3 to t=5, the buffer output 544 changes from 7 to 0 to 1, but the change from 0 to 1 occurs before the 0 is latched by the memory element 570. When the core clock rises to the high state after t=4, the subtractor determines the difference between a buffer output 544, which has a value of 1 to reflect the extra pulse, and the memory element 570, which has a value of 7 because it never latched the 0 value. Thus, the output of the subtractor is not a 1 as expected, and this causes error detected output 490 to indicate that a error had been detected. The extra pulse 515 has been detected. Since there are no other errors in received strobe 510, from time t=4 to t=12 the circuit performs as described with reference to FIG. 3.

Figure 6:
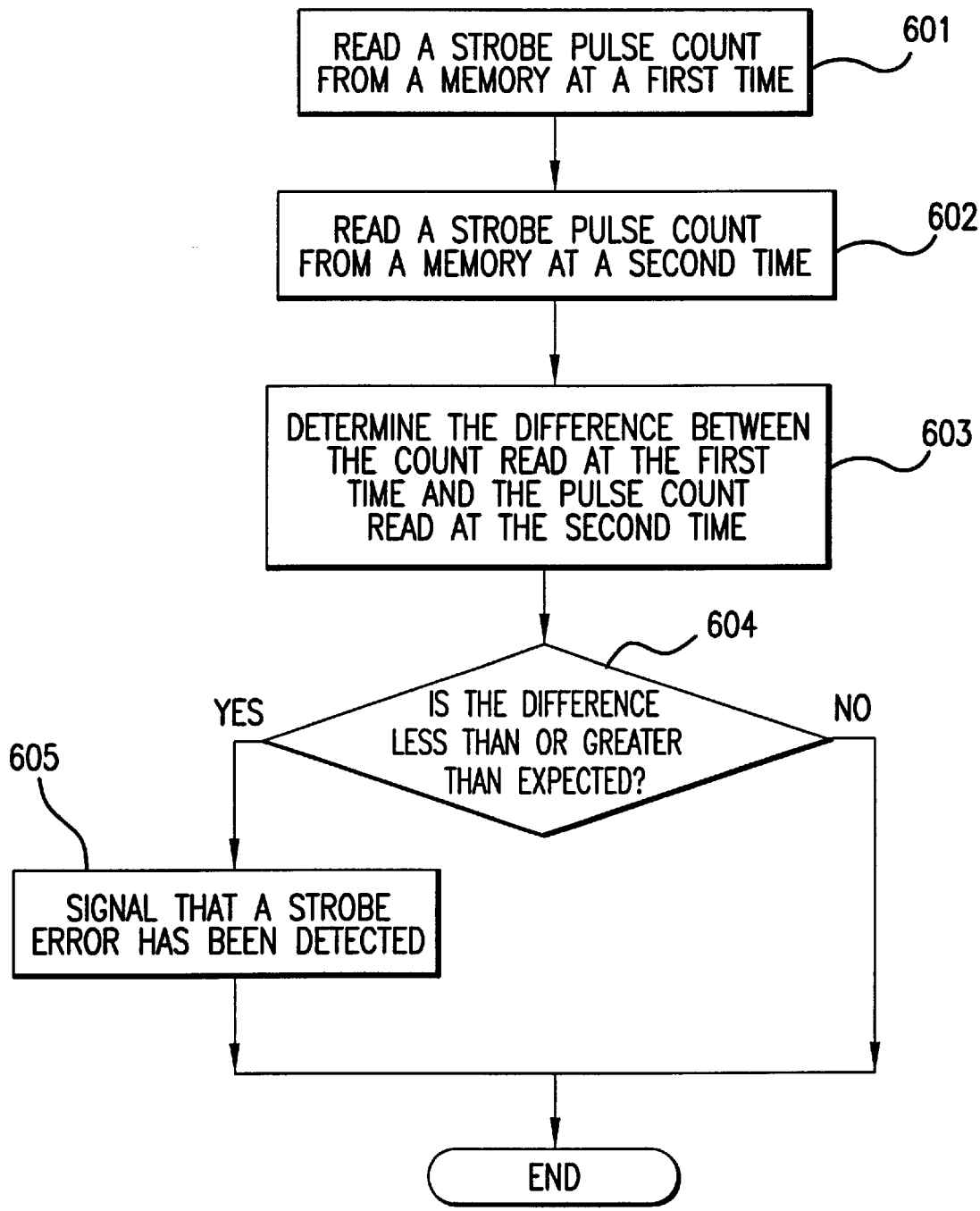
FIG. 6 is a flow diagram of a method of detecting strobe errors according to an embodiment of the present invention.

FIG. 6 is a flow diagram of a method of detecting strobe errors according to an embodiment of the present invention. According to this method, a count of pulses sampled at a strobe input is maintained. This count may be maintained by a counter such as counter 230 of FIG. 2. In an embodiment, each time a pulse received, the counter is incremented. In a further embodiment, the pulse is delayed prior to incrementing the counter.

According to the method shown in FIG. 6, a strobe pulse count is read from a memory at a first time (601), and a strobe pulse count is read from a memory at a second time (602). In an embodiment, the first time and the second time are determined based on a core clock of the receiving node. In an embodiment, the pulse counts are read from a location in a buffer that stores a plurality of pulse counts such as buffer 240 of FIG. 3. In an embodiment, the first pulse count is stored in a memory element such as memory element 270 of FIG. 2. According to the method shown in FIG. 6, the difference between the first pulse count and the second pulse count is determined (604). If the difference is less than or greater than expected, a signal is generated to indicate that a strobe error has been detected (605). In an embodiment, the difference between the first pulse count and the second pulse count is 1.

The present invention provides a method and apparatus for detecting strobe errors by counting strobe pulses and determining if the count has increased as expected. In an embodiment, a core clock signal is used to determine times when the counts are compared. In an embodiment, the strobe input to a node defines the sender's clock domain, and the core clock of the node defines the receiver's clock domain. In an embodiment, the output of a strobe error detected circuit may be recorded for later use in analyzing the performance of the circuit. In an embodiment, the output of the circuit may be used to request that the sending node resend data that was sent using the strobe. In an embodiment, the strobe error detection circuit is part of a chipset.

In an embodiment, when the circuit is initialized, the output of the circuit is masked until the strobes are stable. In a further embodiment, the output is masked until the buffer fills with valid values.

The apparatus and method according to the present invention have been described with respect to several exemplary embodiments. It can be understood, however, that there are many other variations of the above described embodiments which will be apparent to those skilled in the art. It is understood that these modifications are within the teaching of the present invention, which is to be limited only by the claims appended hereto.

We claim:

1. A strobe error detection circuit, the circuit comprising:
   a strobe input;
   a counter coupled to the strobe input to count strobe pulses received;
   a comparator to determine if a strobe error has occurred based on the magnitude of the difference between a first count of strobe pulses and a second count of strobe pulses;
   a clock input, wherein the first count is a value that was stored in a memory location at a first time and the second count is a value that was stored in the memory location at a second time, wherein said first time and said second time are determined using the clock input, wherein said memory location is a location in a buffer, the buffer having a plurality of entries each to store a count of strobe pulses received, the buffer being coupled to and clocked by the strobe input;
   a memory element coupled to the clock input and coupled to the buffer to store a value output from the buffer, the memory element being clocked by the clock input; and
   a subtractor coupled to the memory element and to the buffer to determine a difference between the first count of strobe pulses and the second count of strobe pulses, the subtractor being clocked by the clock input.

2. The strobe error detection circuit of claim 1, wherein the clock received at the clock input has the same frequency as the strobe received at the strobe input.

3. The strobe error detection circuit of claim 1, wherein the buffer has m entries, the counter is an n-bit counter, and m is not a multiple of n.

4. The strobe error detection circuit of claim 1, wherein the circuit further comprises a delay element coupled to the strobe input and to the counter to delay the strobe pulses sampled by the counter.

5. A strobe error detection circuit, the circuit comprising:
   a strobe input;
   a counter having an input coupled to the strobe input;
   a buffer having an input coupled to an output of the counter;
   a subtractor having a first input coupled to an output of the buffer;
   a comparator having an input coupled to an output of the subtractor; and
   a error detection output coupled to an output of the comparator.

6. The strobe error detection circuit of claim 5, wherein the circuit further comprises a delay element that is coupled to the strobe input and to the counter between the strobe input and the counter.

7. The strobe error detection circuit of claim 6, wherein the delay element is a delayed lock loop.

8. The strobe error detection circuit of claim 5, wherein the circuit further comprises a clock input that is coupled to the core clock of the receiving agent, the clock input also being coupled to the subtractor and the comparator.

9. The strobe error detection circuit of claim 8, wherein the core clock of the receiving agent has the same frequency as the strobe input.

10. The strobe error detection circuit of claim 5, wherein the buffer is a deskew buffer.

11. The strobe error detection circuit of claim 5, wherein the circuit further includes a flip-flop having an input coupled to an output of the buffer and coupled to the clock input, the flip-flop also having an output coupled to an input of the subtractor.

12. The strobe error detection circuit of claim 5, wherein the buffer has m entries, the counter is an n-bit counter, and m is not a multiple of n.

13. The strobe error detection circuit of claim 5, wherein the comparator is adapted to indicate on the strobe error output that a strobe error has been detected if a signal representing a value that is not equal to 1 is received from the subtractor.

14. A method of detecting strobe errors, the method comprising:

maintaining a count of pulses sampled at a strobe input;

determining a difference between a first count of strobe pulses and a second count of strobe pulses, wherein the first count of strobe pulses is a value that was read from a memory at a first time, wherein the second count of strobe pulses is a value that was read from the memory at a second time, and wherein the first time and the second time are determined based on a core clock of the node; and signaling that a strobe error has been detected when the difference determined is less than or greater than expected.

15. The method of claim 14, wherein the count of strobe pulses sampled is maintained by incrementing a counter after a strobe pulse was received.

16. The method of claim 15, wherein the pulse is delayed prior to incrementing the counter.

17. The method of claim 14, wherein the memory is a buffer that stores a plurality of pulse counts.

* * * * *